(No Model.)

P. FRICHETTE.
CULTIVATOR.

No. 356,631. Patented Jan. 25, 1887.

Witnesses,

Inventor,
P. Frichette
By Dewey & Co.
Atty

UNITED STATES PATENT OFFICE.

PETER FRICHETTE, OF SHERIDAN, CALIFORNIA.

CULTIVATOR.

SPECIFICATION forming part of Letters Patent No. 356,631, dated January 25, 1887.

Application filed July 14, 1886. Serial No. 208,034. (No model.)

*To all whom it may concern:*

Be it known that I, PETER FRICHETTE, of Sheridan, Placer county, State of California, have invented an Improvement in Cultivators; and I hereby declare the following to be a full, clear, and exact description of the same.

My invention relates to that class of agricultural implements which are used for cultivating the ground, and which are known, according to slight differences of construction, as "cultivators," "harrows," &c.

My invention consists in the improvements hereinafter fully described and claimed.

Figure 1:
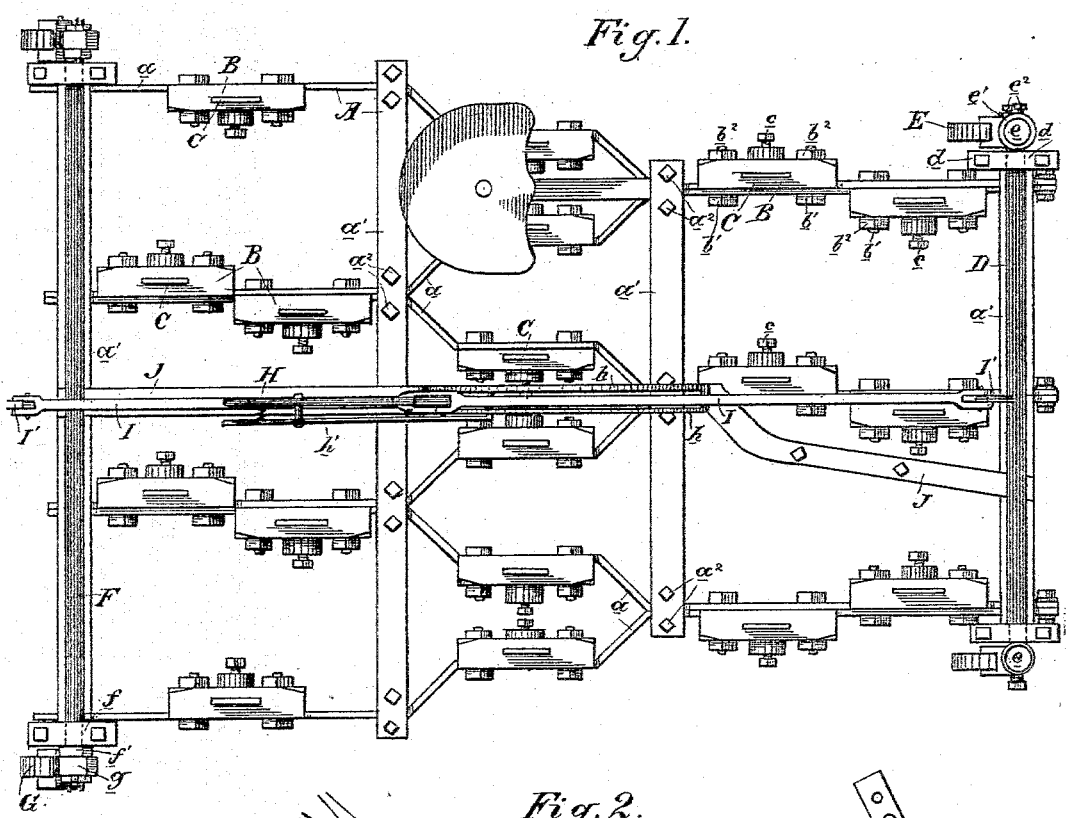
Figure 2:
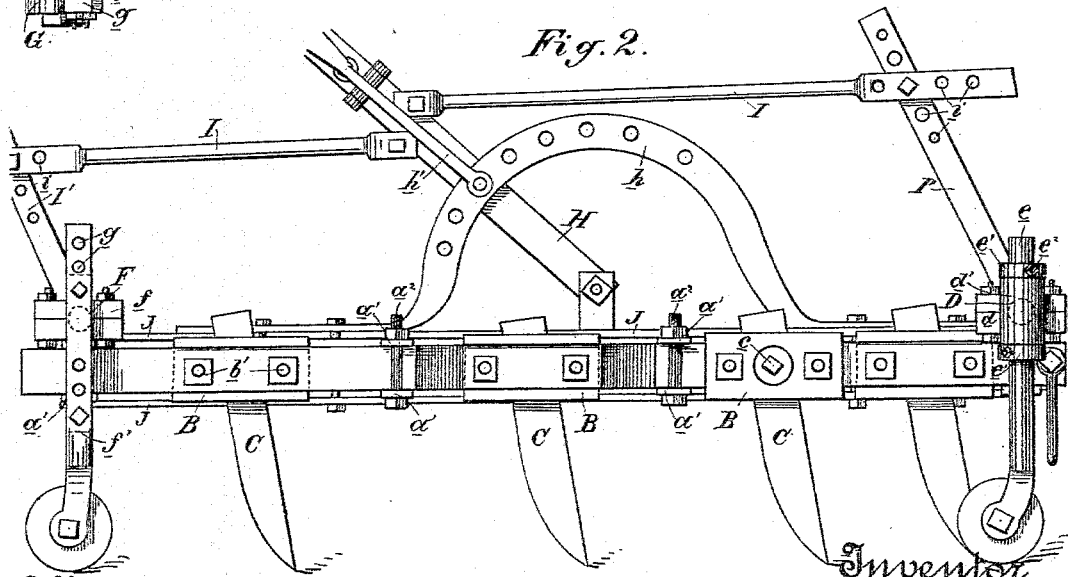
Figure 3:
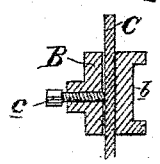

Referring to the accompanying drawings for a more complete explanation of my invention, Figure 1 is a plan of my cultivator. Fig. 2 is a side elevation of same. Fig. 3 is a section of the tooth-securing casting C.

A is the frame of the machine. This is made of flat bars $a$, of iron, set on edge. Each bar is bent out of line at or about its middle, and they are so fitted together that each bar is connected at one end with the bar on one side, and at the other with the bar on the other side. In order to explain this arrangement more perfectly, I call attention to the number of bars shown in the drawings. They number six, and observing them from the front of the machine it will be seen that they are arranged in pairs, the members of each pair lying close together from their forward ends back to where they begin to bend, from which point they diverge, the interior ones meeting the adjacent ones of the next pair, whence they extend in new-formed pairs to the rear of the machine. Looked at from the front, the frame presents the appearance of a number of "Y's" set alongside each other. The bars of the frame are secured together by the cross-bars $a'$, which lie in pairs above and below the bars $a$, and receive bolts $a^2$, the tightening up of which clamps the frame-bars. They are further held together by the bolts which secure the tooth-bearing castings, as I shall now explain.

B are castings, which are socketed to receive the teeth C. These castings are made with a groove or channel, $b$, on their inner faces, of such a size that they fit the side of the frame-bars $a$ snugly. Bolts $b'$ pass through the castings and bars and receive nuts $b^2$, whereby they are held in place. These tooth-bearing castings are placed along the frame-bars at different points, and each is out of line with the other, this position being possible by reason of the bend of the bars, and also by placing them upon opposite sides of the bars. It will be seen that the bolts $b'$, where they pass through the adjacent portions of the bars $a$, serve to hold said bars together.

The teeth C are passed through the sockets of the castings, and are secured therein by the set-screws $c$, whereby they may be tightened in any position desired. The teeth may be of any suitable character, depending upon the use to which the machine is to be put. Thus for a cultivator I would use the ordinary sharpened blade, while for a harrow a simple tooth would be employed. This device for fitting the teeth or blades to the machine is a very effective one, in that the teeth are securely held against the strain, which has a tendency to loosen them, and they can be readily placed in position and as quickly removed. If the castings should become worn, they may be thrown aside without great loss, which is an improvement over the ordinary iron-toothed harrow, in which the teeth pass directly through the bars of the frame and have to be wedged constantly to keep them tight.

Mounted in bearings $d$ on the front of the frame is a rock-shaft, D, the ends of which are provided with vertical crank-sockets $d'$, in which are fitted the standards $e$ of the front wheels, E. The vertical adjustment of the wheels E is effected by means of the collars $e'$ on the standards, which are set by screws $e^2$, whereby their position may be changed with relation to the sockets $d'$.

The collars are not set up close enough to the sockets to prevent the free rotation of the wheel-standards in any direction, for by this movement the frame is enabled to make its turn. Mounted in bearings $f$ on the rear of the frame is a rock-shaft, F, the ends of which have cross-arms or cranks $f'$. To these crank-arms are bolted the standards $g$ of the rear wheels, G. A series of holes, $g'$, are made in the standards, whereby their vertical adjustment is effected. At about the center of the frame A is pivoted a lever, H, the movement of which is controlled and fixed by a slotted curved rack, h, and a spring-actuated pawl, h'. The lever is connected with the front and rear rock-shafts through the links I, pivoted to the lever, and the cranks I' on the shafts, the connection being an adjustable one, by means of the series of holes i, made in the links and in the cranks of the shafts.

The lever and rack, though they may be secured upon the frame in other ways, are here shown as secured to brace-bars J, running longitudinally of the frame above and below and bolted together, as shown. These bars add strength to the frame, and are not in the way of any of the other parts.

By operating the lever H the shafts D F are rocked, whereby the wheels are thrown back and the frame lowered to project the teeth the required distance into the ground. By reversing the lever they are raised again and can be carried clear of the ground, which is of advantage when working in orchards in allowing the machine to pass a tree without injury.

The rotary movement of the standards of the front wheels enables the machine to make its turn, and provides for the use of four wheels upon the machine, instead of the usual number three—namely, two main wheels and a single steering-wheel.

When the machine is used as a simple harrow, I omit the wheels and the adjusting devices, using only the frame and the proper teeth fixed in the castings, as described. Light plow-teeth may be also used in the machine when the work requires it.

The frame constructed as described is strong and yet simple and economical.

The clevises being attached to the front of each pair of bars a equalizes the draft over the entire frame. It is apparent that the width of the frame may be greater or less, as desired, by simply adding to or taking away from the number of bars a, and also that by reversing the bars the wide part of the frame may be in front and the narrow part behind. When working in a vineyard, I would arrange the wheels inside of the outer bars of the frame, so that they should not come in contact with the vines.

Having thus described my invention, what I claim as new, and desire to secure by Letters Patent, is—

1. In a cultivator, the frame A, consisting of the flat bars a, set on edge, each bar being bent out of line at or about its center, and diverging, so as to be connected with the adjacent end of the bar on each side, as shown, in combination with the transverse bars a', adapted to lie in pairs above and below the bars a, and the bolts a², for clamping said bars, substantially as herein described.

2. The bars a, arranged in pairs, and each bar being bent out of line at a point near its center, and diverging, so as to be connected with the end of an adjacent bar, in combination with the castings B, bolted to said bars, and having a grooved face, b, for fitting the sides of the same, and the teeth C, passing through a socket in the casting and secured therein, substantially as herein described.

3. In a cultivator, the toothed frame A, in combination with the wheels E at the forward end, said wheels having standards e, and the wheels G at the rear corners, having standards g, the rock-shaft D on the forward end of the frame, having end sockets, d', in which the standards of the forward wheels are adjustably pivoted, the rock-shaft F on the rear end of the frame, having the crank-arms f', to which the standards of the rear wheels are adjustably connected, the pivoted lever H, having the pawl and ratchet, the links I, the cranks I' of the rock-shafts, and an adjustable connection between the links and cranks, substantially as herein described.

4. A cultivator comprising the frame A, made of the bent flat bars a, the transverse bars a', and the longitudinal brace-bars J, the removable socketed castings B, the teeth C, adjustably fitted to the castings, the wheels E G at the corners of the frame, the rock-shafts D F, having cranks at each end, to which the wheels are adjustably connected, as described, the lever H, the cranks I' of the rock-shafts, the links I, pivoted to the lever, and an adjustable connection between the cranks and links, all arranged and adapted to operate substantially as herein described.

In witness whereof I have hereunto set my hand.

PETER FRICHETTE.

Witnesses:
S. H. NOURSE,
H. C. LEE.